United States Patent [19]

Dalbera

[11] Patent Number: 5,014,935
[45] Date of Patent: May 14, 1991

[54] AUTONOMOUS LOAD EMBARKING AND DISEMBARKING APPARATUS INTEGRATED IN AN AIRCRAFT

[75] Inventor: Jacques M. Dalbera, Arcachon, France

[73] Assignee: Aerospatiale Societe Nationale Industrielle, Paris, France

[21] Appl. No.: 506,027

[22] Filed: Apr. 9, 1990

[30] Foreign Application Priority Data

Apr. 21, 1989 [FR] France ............................ 89 05329

[51] Int. Cl.⁵ .................................................. B64C 1/22
[52] U.S. Cl. .................................. 244/137.1; 414/341
[58] Field of Search ....................... 244/137.1, 137.4; 414/340, 341, 343, 345

[56] References Cited

U.S. PATENT DOCUMENTS

| | | | |
|---|---|---|---|
| 2,425,972 | 8/1947 | Watter | 244/137.1 |
| 2,523,723 | 9/1950 | Santee et al. | 244/137.1 |
| 3,478,904 | 11/1969 | Courter | 244/137.1 |
| 3,799,479 | 3/1974 | Roeder et al. | 244/137.1 |
| 4,000,870 | 1/1977 | Davies | 244/137.1 |
| 4,544,319 | 10/1985 | Folling et al. | 244/137.1 |
| 4,696,609 | 9/1987 | Cole | 244/137.1 |

Primary Examiner—Joseph F. Peters, Jr.
Assistant Examiner—Christopher P. Ellis
Attorney, Agent, or Firm—Martin Smolowitz

[57] ABSTRACT

The apparatus, for an aircraft comprising a platform provided with balls for receiving loads in the region of a lateral door, comprises a foldable rolling track (1), a device (6) for shifting the rolling track transversely of the luggage compartment, in synchronism with the opening of the door (5), from a first folded storage position (32) in the luggage compartment in the region of the door to a second folded position (32') entirely outside the aircraft in which it is articulated by one end to the threshold of the door (5), and vice versa, guide devices (18) which are carried by the platform (12) and in which the rolling track is guidedly mounted, devices (9, 10, 34) for lowering and raising the rolling track (1) in the second position (32'), and a pulling device (39, 40) connected to the platform (12).

11 Claims, 6 Drawing Sheets

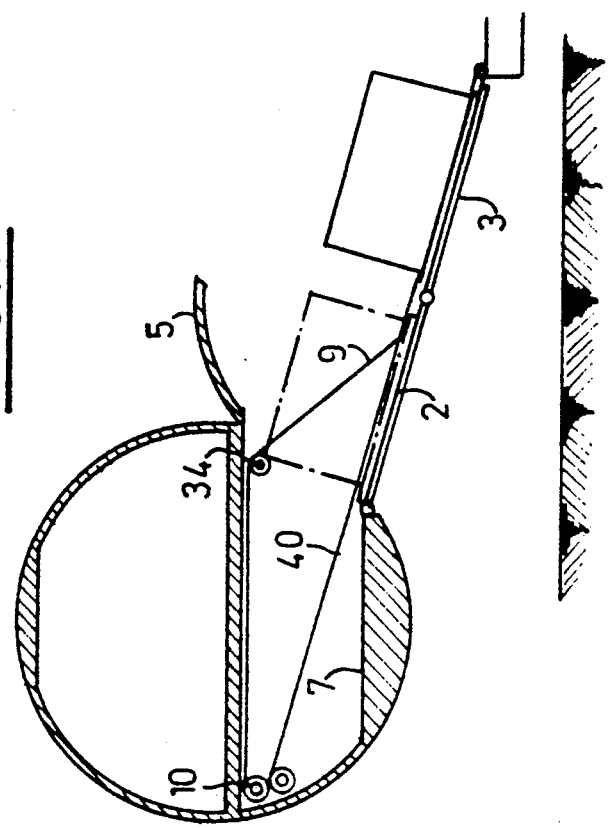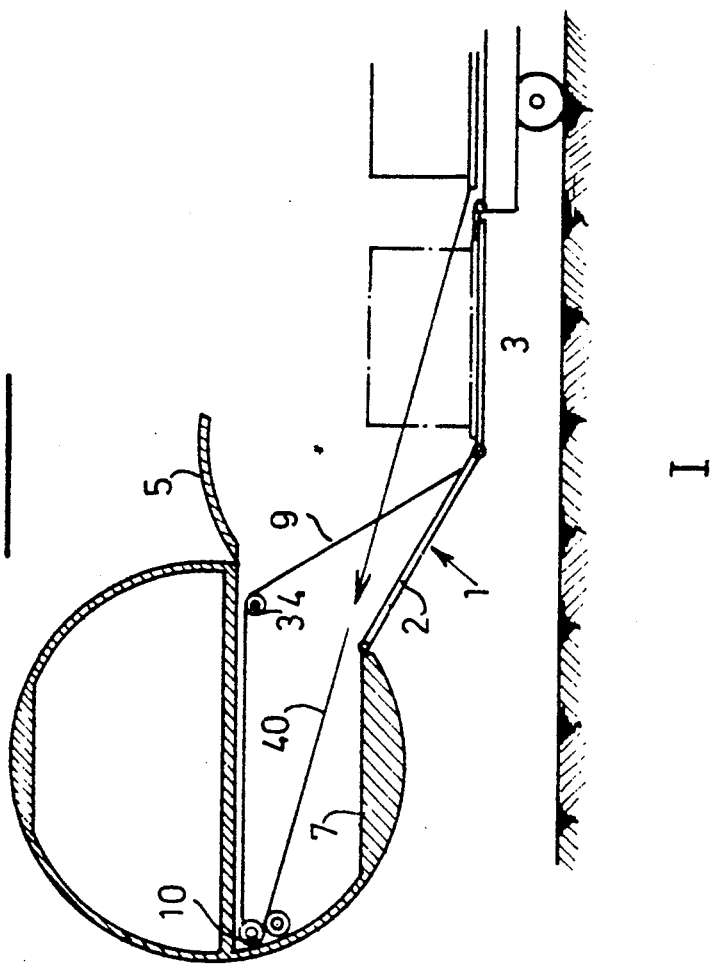

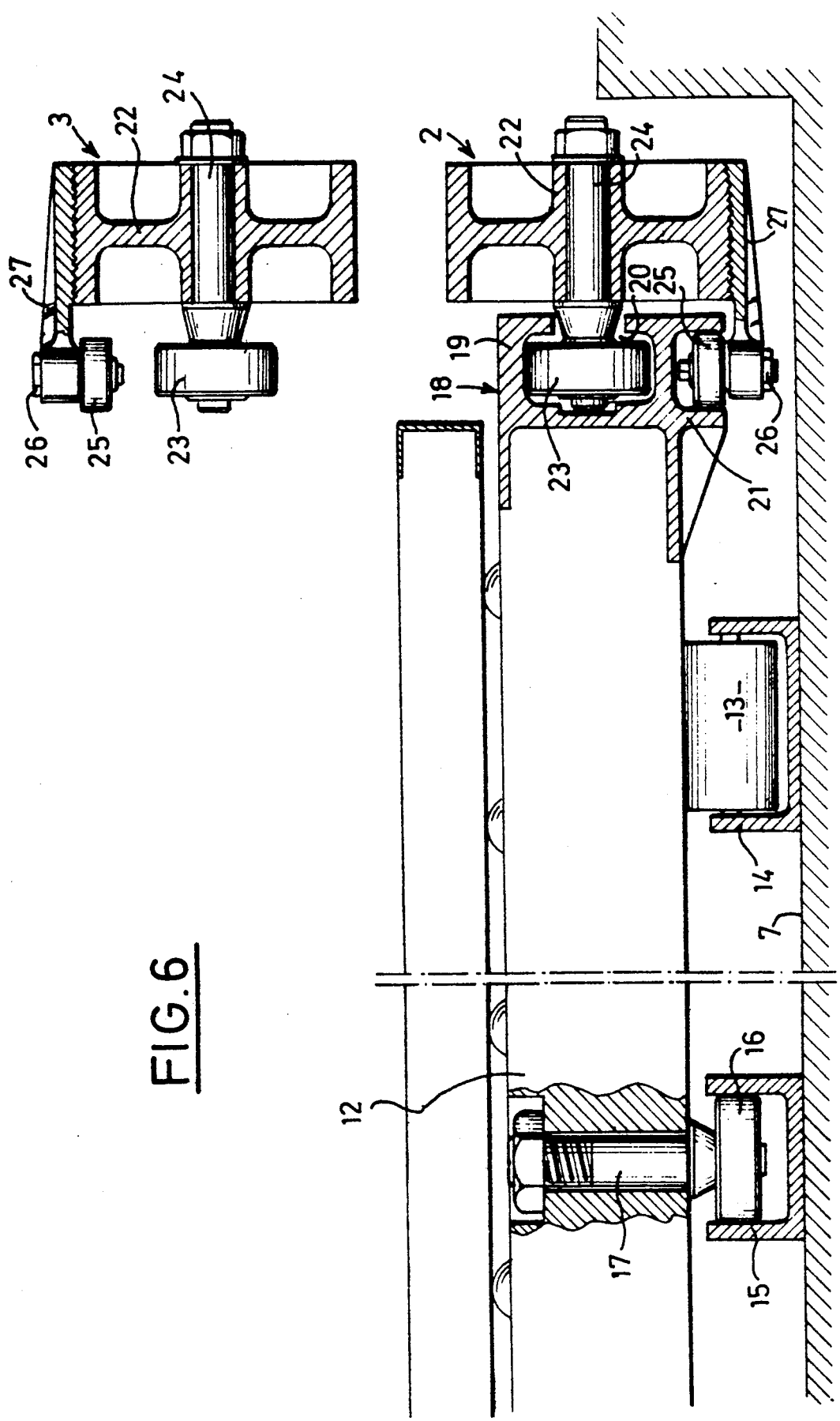

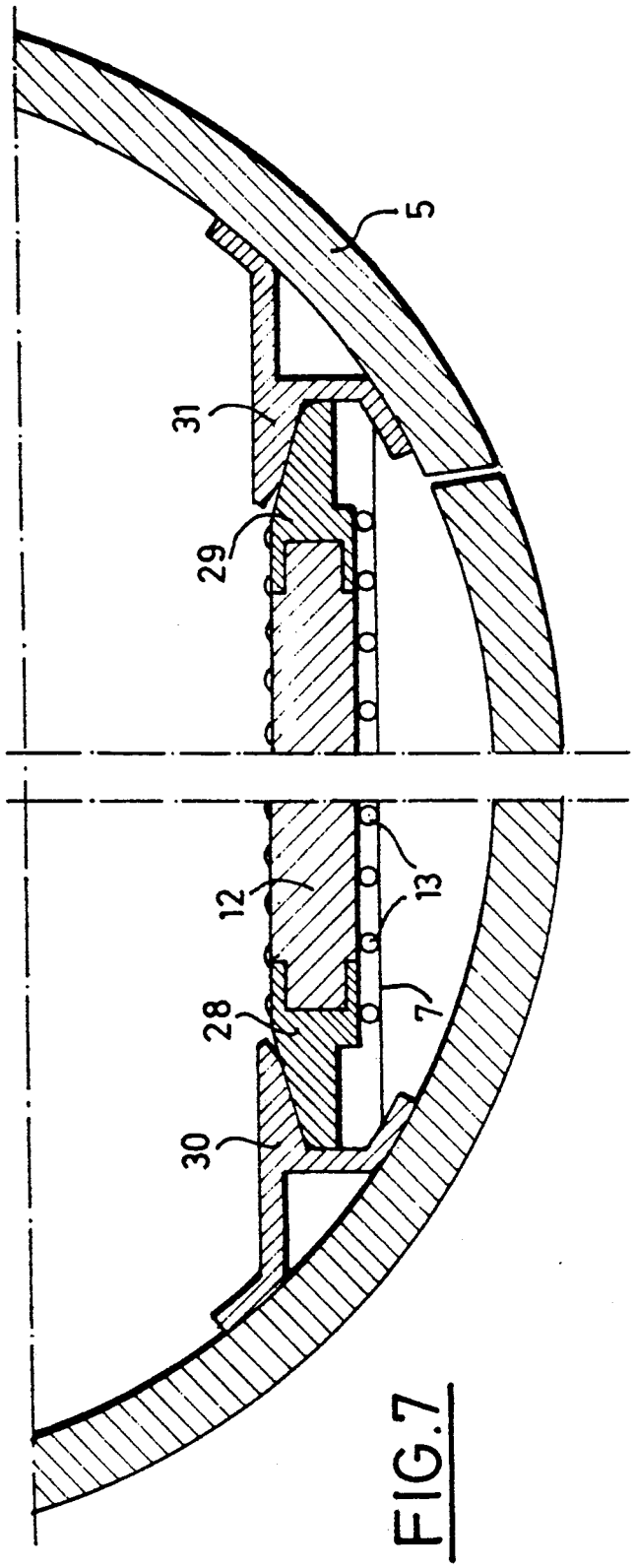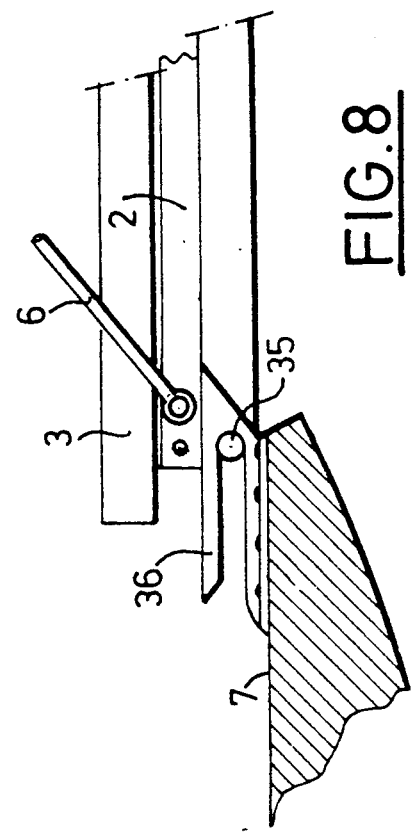

AUTONOMOUS LOAD EMBARKING AND DISEMBARKING APPARATUS INTEGRATED IN AN AIRCRAFT

BACKGROUND OF THE INVENTION

The present invention relates to an apparatus for loading goods in an aircraft with a lateral door.

Goods transported by aircraft are usually arranged as pallets or containers, and the loading operations require specialized raising equipment adapted to seize the pallets or containers and raise them to the height of the luggage compartment by means of the raising apparatus.

For reasons of simplification, there will be used hereinafter the general term "load" for designating the physical load of an aircraft, this term being taken in its broadest sense irrespective of the manner in which this load is arranged or packed.

By its very nature, the specialized equipment employed at airports for loading and unloading aircraft is particularly expensive. Furthermore, some secondary airports, or developing countries, are not yet equipped with these apparatuses.

There is therefore a need for equipment designed to be integrated in an aircraft to permit both the loading and unloading thereof without requiring the aid of specific exterior means.

SUMMARY OF THE INVENTION

Consequently, an object of the invention is to provide an autonomous apparatus, integrated in an aircraft, which is capable of effecting alone the embarking and disembarking of loads on grounds devoid of specialized means.

The invention therefore provides an autonomous load embarking and disembarking apparatus for an aircraft of the type comprising rolling means extending longitudinally in the luggage compartment and on each side of a platform provided with balls and adapted to receive the loads in the region of a lateral door, said apparatus comprising a foldable rolling track, means for shifting said rolling track transversely of the luggage compartment in synchronism with the opening of the door, from a first folded storing position inside the luggage compartment in the region of said door, to a second folded position completely outside, in which it is articulated by one end to the threshold of the door, and vice versa, the platform provided with balls being movable and including guide means in which said rolling track travels, means for lowering and raising the rolling track in its second position, and pulling means connected to the platform provided with balls.

According to another feature of the invention, said rolling track comprises two roughly equal parts articulated together in end-to-end relation, the length thereof corresponding to the width of the floor of the luggage compartment in the region of said door.

According to one embodiment, said parts of the rolling track are each formed by two parallel arms carrying rolling rollers on their confronting sides.

Advantageously, the guide means in which the rolling track travels are formed by C-section rails which are mounted laterally on the movable platform provided with balls and receive said rollers, and in this way maintain the distance between said arms.

According to a further feature of the invention, the means for shifitng the rolling track from its first position to its second position in sychronism with the opening of the door, and vice versa, comprise at least one rigid bar articulated by one end to the lower part of the door and by its opposite end to said end of the rolling track which is articulated to the threshold of the door in its second position.

Preferably, the lowering and raising device comprises a winch inside the luggage compartment and adapted to unwind and wind a cable connected to said rolling track in the vicinity of the articulation of the two parts thereof.

Conveniently, the pulling device for the platform provided with balls is a cable winch.

DESCRIPTION OF THE DRAWINGS

The following description, with reference to the accompanying drawings given as non-limitative examples, will explain how the invention can be carried out.

FIGS. 2 to 4 are diagrammatic views illustrating the operation of the apparatus.

FIG. 6 is a partial sectional view taken on line A—A of FIG. 5.

FIG. 7 is a sectional view showing the platform provided with balls in the storage position, with the door of the luggage compartment in the closed position.

FIG. 8 is a partial view showing the articulation of the rolling track on the threshold of the door of the luggage compartment, in the second position thereof.

DESCRIPTION OF PREFERRED EMBODIMENTS

Figure 1:
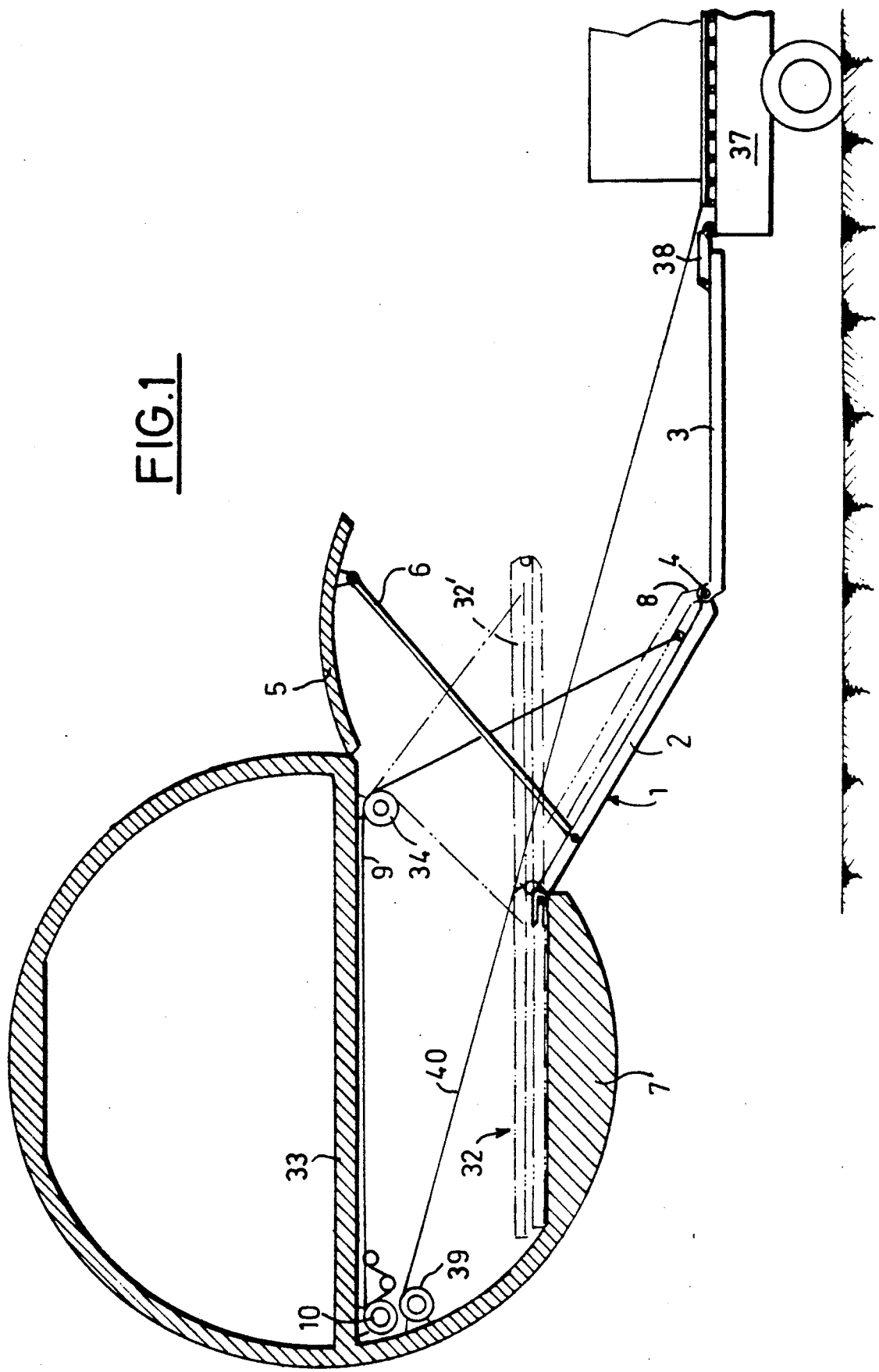
FIG. 1 is a diagrammatic view of the apparatus of the invention, showing different positions of the rolling track.

With reference to the drawings, the apparatus comprises a foldable articulated rolling track generally designated by the reference numeral 1 and including two parts 2,3 articulated together in end-to-end relation about a pin 4.

With reference to FIG. 1, which shows the apparatus of the invention opened out in the position of use, the part 2 is, in this position, articulated by the end opposed to the pin 4 to the threshold of the door 5 and, by this same end, to an end of at least one rigid bar 6 whose other end is retained in a releasable articulated manner on the lower part of the door 5 of the luggage compartment by means which will be described in detail hereinafter.

The end portions of the parts 2 and 3 are slightly cranked in the vicinity of the pivot pin 4, so as to allow the part 3 to be folded onto the part 2 in a position parallel to the latter, as shown in dot-dash lines at 8.

A raising cable 9 fixed to the part 2 of the rolling track in the vicinity of the pivot pin 4 extends toward the door 5 from a winch 10, along the ceiling of the luggage compartment, passes around a pulley 34 above the door, and the end of the cable 9 is connected to the part 2 of the rolling track in the vicinity of the pin 4.

When the two parts 2,3 of the rolling track are folded one onto the other and the winch 10 is actuated, they are raised to the horizontal position shown at 32' and stopped in this position. The door 5 can then be closed by pivoting it in the downward direction.

In this movement, the bars 6 urge the two parts 2,3 inwardly, the part 2 travelling in guide means which will be described hereinafter, transversely on the floor 7 of the luggage compartment so as to reach a storage position inside the latter. It will of course be understood that the length of each of the parts 2 and 3 is roughly equal to the width of the floor of the luggage compartment in the region of the door.

Figure 5:
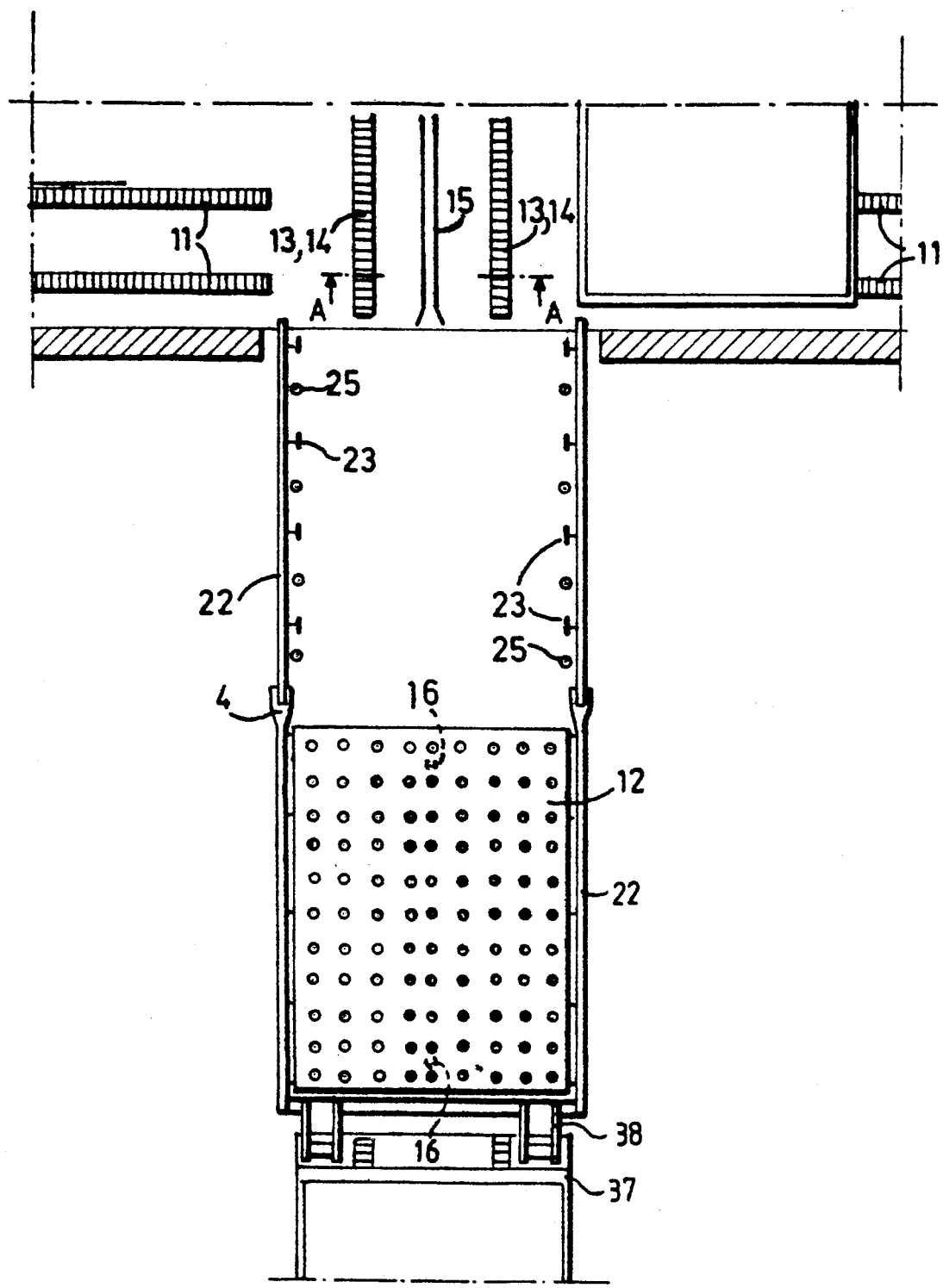
FIG. 5 is a partial plan view of the apparatus.

With reference now to FIGS. 5 and 6, the particular details of the apparatus will be described. The luggage compartment of the aircraft includes in the known manner rolling means 11 constituted by rows of rollers extending in the longitudinal direction of the fuselage and on which the loads are shifted as they are received on a platform 12 provided with balls, which platform is usually fixed in the region of the door between two sections of the rolling means 11.

According to the invention, the platform 12 provided with balls is movable. For this purpose, as shown, there are provided on the floor 7 of the luggage compartment, in the region of the door 5, two parallel rows of rollers 13 rotatively mounted in channel-shaped rails 14, and a median U-section rail 15. The platform 12 provided with balls includes on the median axis of its lower side two rollers 16 freely rotatively mounted on vertical pins 17. It will be understood that the rollers 16 are adapted to guide the platform 12 in the rail 15 when it rolls on the rollers 13.

Further, the platform 12 includes on two longitudinal sides guide rails 18 shown to an enlarged scale in FIG. 6 and each defining in cross section and from top to bottom a first C-shaped part 19 defining a lateral longitudinal slot 20, and a second part 21 having an inverted U-shape, namely open toward the bottom.

Each of the two parts of the rolling track 1 is constituted by two parallel rigid arms 22 having a length which is roughly equal to the width of the floor of the luggage compartment in the region of the door and each including, on one hand, on their confronting sides rollers 23 rotatable about horizontal pins and, on the other hand, rollers 25 rotatively mounted on vertical pins 26 supported in an overhanging manner by transverse supports 27 connected to the arms 22.

The arrangement is such that the platform 12 provided with balls may be carried on each of its sides on the arms 22 by the rollers 23 engaged in the upper part 19 of the rails 18, and guided by the rollers 25 engaged in the lower part 21. With this arrangement, when it is engaged between the arms 22, the platform 12 maintains the distance therebetween.

Further, the front and rear edges 28, 29 respectively of the platform 12 are chamfered as shown in FIG. 7 so as to engage, in the storage position, on one hand, under a ledge of a front abutment element 30 and, on the other hand, under a ledge of a stop element 31 mounted on the lower part of the door 5 in the closed position of the latter.

The means for lowering and raising the rolling track comprise in practice two cables 9 each fixed to an arm 22 in the vicinity of the pin 4 so as to avoid any twisting of the assembly.

There will now be described the operation of the apparatus starting in its first folded position of storage in the luggage compartment of the aircraft, shown at 32 in FIG. 1, in which the part 3 of the rolling track is folded about the pin 4 on top of the part 2, and the door 5 is in the closed position.

In this position, the rollers 23 and 25 of the arms of the part 2 of the rolling track are respectively engaged in the parts 19, 21 of the lateral rails 18 of the platform 12, which rests on the rollers 13 and whose lower rollers 16 are engaged in the rail 15. The front chamfered edge 28 of the platform 12 is engaged under the ledge of the front abutment 30 which blocks it in position, while its rear chamfered edge 29 is engaged under the ledge of the rear abutment 31 connected to the door 5. The cables 9 are wound around the drum of the winch 10, extend along the ceiling 33 of the luggage compartment to the upper edge of the door where they pass around pulleys 34. The bars 6 connecting the end of the part 2 opposed to the pin 4 to the lower part of the door 5 are substantially aligned with the arms 22 of the parts 2 and 3 of the rolling track.

When the door 5 of the luggage compartment is opened, the rear edge of the platform is released and the bars 6 pull along therewith the assembly comprising the two parts of the rolling track and the platform 12 disposed between the arms of the part 2, to the position 32' shown in FIG. 1, this assembly being maintained in this position by the cables 9 of the winch 10 which is locked, the end of the part 2 opposed to the pivot pin 4 being then stopped on the threshold of the door by the engagement of two lateral abutments 35 connected to the arms 22 in two lateral stop means 36 (FIG. 8).

The winch 10 is then actuated so as to unwind the cables 9 until the opposite end of the part 2 carrying the pin 4 is located at the height of a platform 37 of a vehicle transporting loads. The part 3 of the rolling track 1 is then manually unfolded until its end bears against the platform 37.

Advantageously, the end of the part 3 opposed to the pin 4 may be provided with detachable bearing means 38 in the shape of hooks mounted on the free ends of the arms of the part 3 of the rolling track, and each advantageously terminating in a roller for the purpose of allowing longitudinal displacements of the assembly, the apparatus then being in the position I shown in FIG. 2.

The winch 10 is then actuated so as to raise the rolling track by bringing the part 3 into the extension of the part 2 (position II FIG. 3) and the platform 12 is allowed to descend to the edge of the platform 37, it being retained by means of a cable 40 which is fixed thereto and connected to the drum of a second winch 39.

The winch 10 is again actuated to unwind the cable 9 and return the assembly to the position I shown in FIG. 2 in which the load can be placed on the platform 12, as shown in dot-dash lines.

The winch 10 is then again actuated in order to raise the rolling track with its two parts in alignment in position II (FIG. 3), and the load is pulled up to the threshold of the door by the winch 39.

Figure 4:
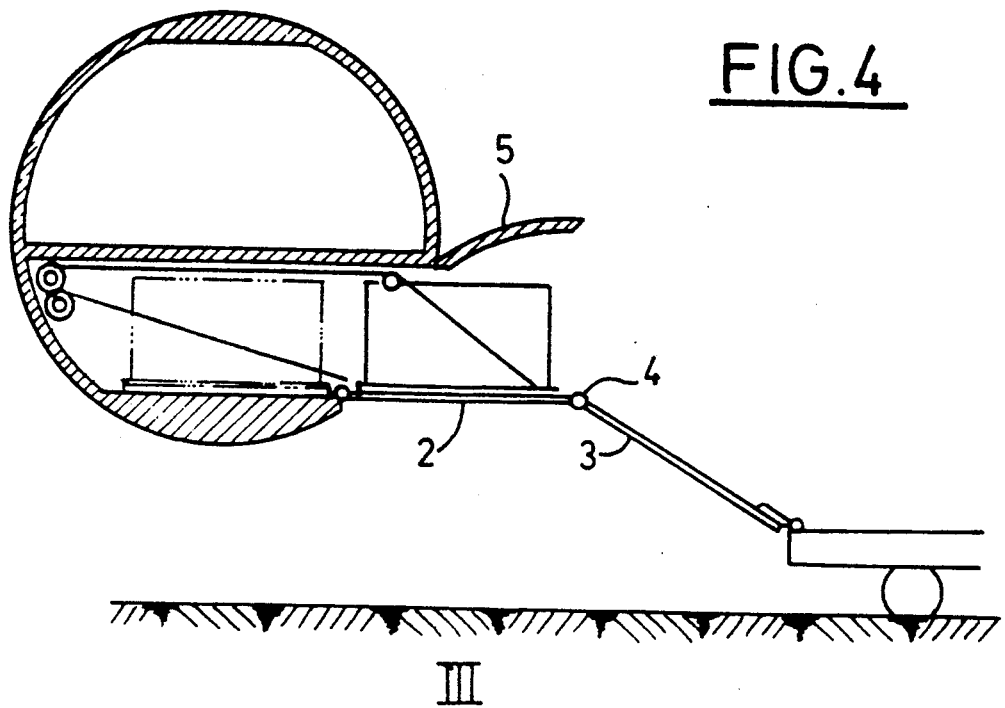

The winch 10 is again actuated and returns the part 2 of the rolling track to the horizontal position III (FIG. 4) and the load is brought on board the aircraft on the platform 12 which leaves the arms 22 of the part 2 and rolls along the rollers 13, it being guided in the rail 15 by its rollers 16. The load can then be shifted in the forward or rearward direction in the luggage compartment of the aircraft on the rolling means 11.

The operations just described are carried out in the opposite way for disembarking the loads.

The embarking operations and the disembarking operations require no special equipment on the ground, nor any handling devices; which characterizes an autonomous system.

Figure 9:
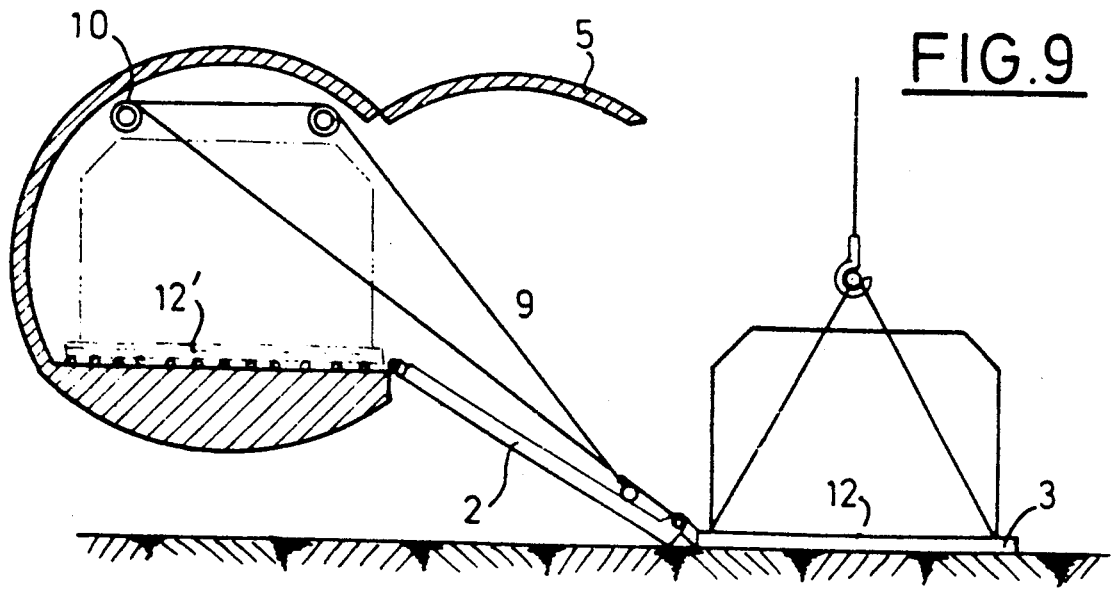
FIG. 9 shows another possibility of the utilisation of the apparatus.

FIG. 9 shows another embodiment of the apparatus according to the invention in which a load delivered by a crane is embarked. In this case, when the assembly of the folded rolling track is moved out with the platform 12 (position 32' in FIG. 1), it is lowered by means of the winch 10 until the end of the folded assembly, which includes the pivot pin 4, bears directly on the ground, and the part 3 of the rolling track is then unfolded flat against the ground. The remaining operations are the same as described hereinbefore.

What is claimed is:

1. Autonomous apparatus for embarking and disembarking loads for an aircraft, which aircraft comprises a luggage compartment having a floor, the apparatus comprising a lateral doorway in the aircraft having a threshold and a door for closing the doorway; a movable platform provided with balls for receiving the loads in the region of the doorway, rolling means extending longitudinally in the luggage compartment on each side of the platform, a foldable rolling track, means connected to the rolling track and to the door for shifting the rolling track transversely of the luggage compartment, in synchronism with the opening of the door, from a first folded storage position inside the luggage compartment in the region of the doorway to a second folded position entirely outside the luggage compartment; means for articulating an end of the rolling track in said second position thereof to the threshold of the doorway, and vice versa, guide means provided on the platform, the rolling track being movably rollable in the guide means, means for raising and lowering the rolling track in the second position thereof, and pulling means connected to the platform.

2. Apparatus according to claim 1, wherein the rolling track comprises a first part and a second part which are substantially equal in length, a pivot pin articulating the first part and second part together, the lengths of the rolling track parts being substantially equal to the width of the floor of the luggage compartment in the region of the doorway.

3. Apparatus according to claim 2, wherein the first part and second part of the rolling track each comprise two rigid parallel arms having confronting sides.

4. Apparatus according to claim 3, wherein the arms carry first rolling rollers rotatable about axes perpendicular to the confronting sides of the arms and second rollers rotatable about axes parallel to the confronting sides of the arms.

5. Apparatus according to claim 4, wherein the guide means for the platform comprise rails mounted laterally on the platform and each comprising a first C-section part open toward the exterior and cooperable with the first rollers and a second U-section part cooperable with the second rollers, whereby the distance between the arms is maintained.

6. Apparatus according to claim 1, wherein the means for shifting the rolling track from the first position to the second position thereof in synchronism with the opening of the door, and vice versa, comprise at least one rigid bar articulated by a first end to a lower part of the door and by a second end opposed to said first end to the end of the rolling track which is articulated to the threshold of the doorway in the second position thereof.

7. Apparatus according to claim 2, wherein the means for lowering and raising the rolling track comprise a winch inside the luggage compartment and a cable connected to the winch for being selectively unwound and wound by the winch, a pulley located above the doorway around which pulley the cable passes, the cable being connected to the first part of the rolling track in the vicinity of the pivot pin.

8. Apparatus according to claim 1, wherein the pulling means for the platform comprise a winch and a cable connected to the platform and connected to the winch for being selectively unwound and wound by the winch.

9. Apparatus according to claim 2, comprising two stop means on opposite sides of the threshold of the doorway, and laterally projecting abutments mounted on an end of the first part of the rolling track which is opposed to the pivot pin and respectively cooperable with the two stop means.

10. Apparatus according to claim 9, comprising on the floor of the luggage compartment, in the region of the doorway, a guide rail and two rows of rollers extending on each side of the guide rail transversely of the floor of the luggage compartment.

11. Apparatus according to claim 10, comprising a guide roller mounted on an underside of the platform and cooperable with the guide rail.

* * * * *